US009567711B2

(12) United States Patent
Duthoit et al.

(10) Patent No.: US 9,567,711 B2
(45) Date of Patent: Feb. 14, 2017

(54) METHOD FOR PRODUCING AN EMULSION OF ALKENYL SUCCINIC ANHYDRIDE (ASA) IN AN AQUEOUS SOLUTION OF A CATIONIC AMYLACEOUS SUBSTANCE, RESULTING EMULSION, AND USE THEREOF

(71) Applicant: ROQUETTE FRERES, Lestrem (FR)

(72) Inventors: Gilles Duthoit, Hazebrouck (FR); Nicolas Leroy, La Gorgue (FR)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 14/405,226

(22) PCT Filed: Jun. 12, 2013

(86) PCT No.: PCT/FR2013/051374

§ 371 (c)(1),
(2) Date: Dec. 3, 2014

(87) PCT Pub. No.: WO2013/186491

PCT Pub. Date: Dec. 19, 2013

(65) Prior Publication Data

US 2015/0114258 A1 Apr. 30, 2015

(30) Foreign Application Priority Data

Jun. 12, 2012 (FR) ..................................... 12 55493

(51) Int. Cl.
*C08L 3/00* (2006.01)
*D21H 21/16* (2006.01)
*B01F 3/08* (2006.01)
*D21H 17/29* (2006.01)
*D21H 17/15* (2006.01)
*D21H 17/16* (2006.01)

(52) U.S. Cl.
CPC ............ *D21H 21/16* (2013.01); *B01F 3/0807* (2013.01); *D21H 17/15* (2013.01); *D21H 17/16* (2013.01); *D21H 17/29* (2013.01); *B01F 2215/0036* (2013.01)

(58) Field of Classification Search
CPC .. B01F 3/0807; B01F 2215/0036; D21H 7/15; D21H 7/16; D21H 7/29; D21H 21/16
USPC ...................................................... 106/209.1
See application file for complete search history.

(56) References Cited

U.S. PATENT DOCUMENTS

| | | | |
|---|---|---|---|
| 5,595,631 | A | 1/1997 | Tsai et al. |
| 5,653,915 | A | 8/1997 | Pardikes |
| 5,658,378 | A | 8/1997 | Tsai et al. |
| 6,207,719 | B1 | 3/2001 | Pardikes |
| 6,787,574 | B1 | 9/2004 | Farley et al. |

FOREIGN PATENT DOCUMENTS

| | | |
|---|---|---|
| EP | 0186956 | 7/1986 |
| EP | 0743394 | 11/1996 |
| FR | 2 897 280 | 8/2007 |
| WO | 96/35840 | 11/1996 |
| WO | 97/35068 | 9/1997 |
| WO | 98/33981 | 8/1998 |
| WO | 2005/014709 | 2/2005 |
| WO | 2006/096216 | 9/2006 |
| WO | 2006/113519 | 10/2006 |

OTHER PUBLICATIONS

International Search Report dated Oct. 1, 2013, corresponding to PCT/FR2013/051374.

*Primary Examiner* — Kaj K Olsen
*Assistant Examiner* — Alexander Polyansky
(74) *Attorney, Agent, or Firm* — Young & Thompson

(57) ABSTRACT

A method for producing an emulsion of ASA in an aqueous solution of a cationic amylaceous substance, without having to use a loop for recirculating the product at the emulsification unit. The produced emulsion is characterized by both a fine and monodisperse particle size, and no overheating is involved that could lead to negative phenomena of hydrolyzing the ASA. The corresponding production device is also described.

4 Claims, No Drawings

METHOD FOR PRODUCING AN EMULSION OF ALKENYL SUCCINIC ANHYDRIDE (ASA) IN AN AQUEOUS SOLUTION OF A CATIONIC AMYLACEOUS SUBSTANCE, RESULTING EMULSION, AND USE THEREOF

FIELD OF THE INVENTION

The present invention is directed toward a method for manufacturing an emulsion of alkenylsuccinic anhydride (ASA) in an aqueous solution of a cationic starchy material, it being understood that the oily phase consists of the ASA, the starchy solution acting as a support for said emulsion. The term "aqueous solution of a cationic starchy material" means a composition containing at least one cationic starch in aqueous solution.

BACKGROUND OF THE INVENTION

The process described in the present patent application does not use a recirculation loop of the product in the emulsification unit. The emulsion thus manufactured has both a fine and monodisperse particle size, and does not show any heating that might lead to detrimental hydrolysis of the ASA. An efficient process that is simple to perform, especially on a papermaking production site, for producing an emulsion that will advantageously be used as a sizing agent in the manufacture of paper sheets is thus provided.

In the field of papers and other cardboards, "sizing" operations are aimed to give these supports improved properties, especially in terms of hydrophobization and resistance to the penetration of hydrophilic species such as water and aqueous inks. In this regard, use is made of "sizing" compositions that contain hydrophobic substances.

Such compositions are equally used as a mixture with the fibrous mass of cellulose that constitutes the structure of cardboard or paper (internal sizing) or as an application to at least one of the faces of this structure (external sizing, sizing, surfacing or coating). The present invention relates here to the exclusive field of internal sizing. For terminological convenience, the simple term "sizing" will denote the term "internal sizing" as defined above.

One of the compounds frequently used in sizing compositions is alkenylsuccinic anhydride or ASA. This chemical species, which is immiscible in water, must be emulsified in order to be used advantageously in the form of a liquid product: good contact between the ASA and the cellulose fibers is thus allowed.

To perform this emulsification, it is known practice to use concomitantly aqueous solutions of cationic starchy materials of different nature, the starchy material being optionally modified; the function of such compositions is to avoid coalescence of the ASA particles by positive ionization of the surface of the particles, and to bring the ASA particles close to the fibers via an ionic mechanism. Broadly speaking, a cationic starchy material/ASA dry weight ratio of between 0.2 and 4 is used.

Such liquid compositions based on ASA and cationic starchy material are especially reported in documents WO 96/35840 A1 and WO 97/35068 A1. They optionally contain surfactants that increase the dispersibility of the ASA, these substances nevertheless being able to interact negatively with the ASA according to the teaching of document WO 97/35068 A1.

Besides the capacity of giving improved properties to the final product, the emulsion of ASA in the aqueous solution of cationic starchy material must have a certain number of characteristics. It must especially have great acuteness of particle sizes, and also a narrow distribution spectrum of these sizes ("monodisperse" product). As explained in document WO 97/35068 A1, these parameters condition the efficacy of the sizing composition with regard to the hydrophobicity properties that it is supposed to impart.

In this respect, it is well known that the presence of "coarse" particles is a source of fouling, especially of the various items of equipment in which the sizing composition transits, but also of the dryer section of the paper machine by steam entrainment of these coarse particles (which may occasionally lead to fires). Conversely, particles of said composition that are too "fine" will pass through the fibrous mattress and will be carried away in the process waters during draining. It is thus necessary to have a sizing composition in the form of an emulsion that has a maximum number of particles whose diameter is centered on an optimum size that a person skilled in the art estimates at between 1 μm and 1.5 μm.

In order to determine the particle size distribution, use is generally made of a laser particle size analyzer which allows counting, by number or by volume, the particles having a certain diameter, or having a mean diameter within a certain range: this is then referred to as particle size distribution and particle population as a function of the range under consideration. In the present patent application, the term "narrow particle size distribution" will be used when at least 80% by volume of said particles have a diameter of less than 2 μm, and when the mean diameter is between 1 μm and 1.5 μm.

The first of these characteristics reflects a reduced proportion of "coarse" particles (diameter greater than 2 μm). By specifying that the mean diameter is within a range which excludes particles that are too fine (whose mean diameter is less than 1 μm), a "narrow" and "monodisperse" particle size distribution is clearly defined, this distribution being centered on the range from 1 μm to 1.5 μm. Moreover, it is specified that in the present patent application, the particle sizes are always measured using a laser particle size analyzer sold by the company Malvern under the name Mastersizer® 2000. The corresponding measuring procedure is reported in the experimental section of the present document.

The prior art mentions a certain number of documents relating to devices and methods for producing emulsions of ASA in an aqueous solution of cationic starchy material. The general principle is as follows: preparing in a first stage an aqueous solution of cationic starchy material, mixing it homogeneously with ASA, and finally preparing an emulsion from this mixture of ASA and of this aqueous solution of cationic starchy material in an emulsification unit. This unit is characterized by the presence of mechanical means of milling or shearing, which micronize and disperse the particles.

In order to prepare such an emulsion having a narrow particle size distribution, the person skilled in the art has for a long time realized that one of the keys of the process was based on the energy employed for the actual emulsification operation, but also in a system for recirculating this emulsion in the emulsification unit. Intuitively, it is understood that this recirculation loop allows many passes of the product into the emulsification unit, which facilitates the micronization process and thus increases the particle dispersion.

As examples illustrating this concept, reference may be made notably to documents U.S. Pat. No. 6,207,719 and U.S. Pat. No. 5,653,915, which directly concern the preparation of an ASA emulsion, using various devices. It clearly appears that the principle of recirculation of the product in the emulsification means is information that has been acquired and integrated by the person skilled in the art (see notably step D of claim 1 of the first document, and step C of claim 1 of the second document). As regards the documents already mentioned, document WO 96/35840 A1 remains silent regarding the devices used, whereas document WO 97/35068 A1 mentions a Gaulin mixer in its examples, this mixer being known to have a recirculation loop.

SUMMARY OF THE INVENTION

Now, and surprisingly since it is in contradiction with what is taught by the prior art, the Applicant has now developed a process for manufacturing an emulsion of ASA in a composition of cationic starchy material, without a loop for recirculating the product into the emulsification unit. This process leads to a product having the required granulometric characteristics, namely a narrow particle size distribution centered on a range between 1 μm and 1.5 μm.

One of the things that the Applicant can be credited with is that it looked beyond the received idea that a recirculation loop was necessary in such a process. It is also to the Applicant's credit to then have known how to adapt said process so as to ensure the stability and the granulometric properties of the manufactured emulsion, while at the same time getting rid of a recirculation loop. In concrete terms, the Applicant has demonstrated that it is the selection of a certain solids content ranging from 5.5% to 11.5% for the initial solution of cationic starchy material which makes it possible not only to get rid of a recirculation loop, but which leads to a particle size distribution that is even narrower than that observed according to the prior art. Knowing that this parameter conditions the future performance of the product in terms of paper sizing, it may be understood that the process according to the present invention leads to an emulsion that potentially proves to be very efficient in terms of final application.

Furthermore, and advantageously, the person skilled in the art is thus provided with a process that is simple to use, notably directly in a papermaking factory, and free of a recirculation loop: it is a continuous process, which leads to the desired product in a single pass in the emulsification unit.

In addition, the emulsion obtained from the process according to the invention has a temperature that is very close to those of the starting products (i.e. ASA and the solution of cationic starchy material), the slight increase being due to the heating caused by the single pass through the emulsification unit. Conversely, the prior art systems which have a recirculation loop lead to large temperature increases (occasionally greater than 40° C.) due to the principle of recirculation itself: this increase is harmful to the final product, since it accelerates the hydrolysis of the ASA.

Furthermore, the Applicant has demonstrated that said process, which is thus a continuous process, can be performed for several hours, without modification of the granulometric characteristics of the emulsion. Finally, it has also demonstrated that this process allows the use of surfactants without impairing the final product, either as regards its stability or as regards its granulometric characteristics. This is another substantial advantage, since problems of negative interaction between ASA and surfactants have been reported in the prior art (as already discussed in document WO 97/35068 A1).

DETAILED DESCRIPTION OF THE INVENTION

Thus, a first subject of the present invention consists of a process for manufacturing an emulsion of ASA in an aqueous solution of cationic starchy material, comprising the steps of:

a) preparing an aqueous solution of cationic starchy material, b) mixing the ASA and the aqueous solution of cationic starchy material obtained from step a), so as to obtain a cationic starchy material/ASA dry weight ratio of less than 1, preferentially between 0.2 and 0.6 and very preferentially between 0.3 and 0.5, c) preparing in a single pass in an emulsification unit an emulsion from the mixture obtained from step b), characterized in that:

the process does not involve recirculation of the emulsion obtained from step c) in the emulsification unit, and in that the solids content of the aqueous solution of cationic starchy material obtained from step a) is between 5.5% and 11.5% and preferentially between 7% and 10% of its total weight.

Step a) of preparing the aqueous solution of cationic starchy material consists either in providing an aqueous solution of cationic starchy material, as commercially available, or in diluting the latter with water, so as to obtain the desired solids content. This content, between 5.5% and 11.5% and preferentially between 7% and 10% of the total weight of the solution prepared is the essential parameter to be adjusted for this first step.

For all intents and purposes, it is pointed out that the term "cationic starchy material" denotes a starchy material obtained via any of the known processes for cationization in aqueous medium, in solvent medium or in the dry phase, provided that this process allows one or more nitrogen groups of electropositive nature to bind to said starchy material. Reference may be made notably to document WO 2005/014709 A1. As examples of aqueous solutions of cationic starchy materials that may be used according to the present invention, mention may be made of the products sold under the range Vector® SC and IC (Roquette), Raisabond® 15 (Chemigate), Licocat® P (Suedstaerke), Lyckeby® LP 2145 and LP 1140 (Lyckeby), Redisize® 205 and Redibond® 4000 (National Starch) and Raifix® 25035 and 01035 (Ciba Raisio).

Step b) consists, starting with standard mixing means, which notably allow regulation of the mass concentrations of the constituents, in preparing the mixture between the aqueous solution of cationic starchy material derived from step a) and ASA. Said mixture and ASA are placed in a mixer, which is ideally a static mixer, but may also consist of a dynamic mixer, or a "venture" mixer, according to the term well known to those skilled in the art.

Step c) consists in circulating in a single pass the mixture that was obtained in step b), in an emulsification unit. This unit denotes any device that is well known to those skilled in the art, and which notably has mechanical means whose purpose is to micronized and homogeneously disperse the liquid that it is desired to emulsify. Such devices are notably the Process Pilot DR 2000/4 (IKA) or Ytron Z (Ytron) machines.

The unit in which the aqueous solution of cationic starchy material (a') is prepared, the mixer (b') and the emulsification unit (c') are entirely standard devices, connected to each other ideally via pipes, enabling the circulation of the various liquids. For the purposes of the present invention, the devices should be considered as being devices that are suitable for performing the process according to the invention, at the industrial scale. The emulsification unit (c') is notably linked to the paper machine such that the emulsion that is useful for sizing paper or cardboard can be introduced in wet-end, in general at one or two points of introduction. Typically, the manufacture of the emulsion consumes at least 5 liters of ASA per hour and preferentially at least 10 liters of ASA per hour.

Thus, a subject of the present invention is in particular a process for manufacturing an emulsion of ASA in an aqueous solution of cationic starchy material as described above, which is performed in a device consisting of:

- a unit a' for storing an aqueous solution of cationic starchy material to perform step a),
- a unit b' for mixing ASA and an aqueous solution of cationic starchy material, connected to the unit a', to perform step b),
- a unit c' for emulsifying the mixture of ASA and of the aqueous solution of cationic starchy material, connected to the unit b', to perform step c), said device not containing a recirculation loop in the emulsification unit c'.

The process according to the present invention is also characterized in that the ASA is preferentially a product of synthetic origin; it is actually modified oils which result from C16-C18 fractions. Among the commercially available ASAs that may be used in the present invention, mention may be made of the product Chemsize® A 180 (Chemec).

This process is also characterized in that the aqueous solution of cationic starchy material has a content of fixed nitrogen of less than 3.5%, preferentially between 0.3% and 3.5% and very preferentially between 0.7% and 2% by dry weight of nitrogen relative to the total weight of cationic starchy material.

This cationic starchy material may optionally be modified by means of an operation chosen from hydrolysis, chemical and physical, mechanical, thermomechanical or thermal transformations. A hydrolysis operation, which very directly targets the reduction of the molecular mass and, in the majority of cases, the reduction of the viscosity, may be performed via various means such as chemical means, commonly via the action of an acid, a base or an oxidizing agent or via enzymatic action, most commonly with amylase. The common chemical modifications are of various nature, such as oxidation, especially with hypochlorite, esterification, such as acetylation, etherification, for example, by cationization, carboxymethylation or hydroxypropylation. The physical treatments may be performed via thermomechanical means, such as extrusion or pregelatinization, or thermal means, such as those known to a person skilled in the art under the name Hot Moisture Treatment (HMT) or annealing.

Another subject of the present invention consists of a device consisting of:

- a') a unit for storing an aqueous solution of cationic starchy material,
- b') a unit for mixing ASA and the aqueous solution of cationic starchy material, connected to the unit a'),
- c') a unit for emulsifying the mixture of ASA and of the aqueous solution of cationic starchy material, connected to the unit b'), said device being free of a recirculation loop in the emulsification unit.

The various units have been described previously. They are connected together by means of pipes and pumps that ensure the circulation of the products in these pipes. A person skilled in the art will know how to adapt said device for its implementation in a paper production factory.

Another subject of the present invention consists of an emulsion of ASA in an aqueous solution of cationic starchy material, having:

- a cationic starchy material/ASA dry weight ratio of less than 1, preferentially between 0.2 and 0.6 and very preferentially between 0.3 and 0.5,
- a particle size distribution such that at least 80% by volume of said particles have a diameter of less than 2 μm, and a mean diameter of between 1 μm and 1.5 μm as determined by laser granulometry using a device sold by the company Malvern under the name Mastersizer® 2000.

This emulsion is also characterized in that the ASA it contains is a product preferentially of synthetic origin.

It is also characterized in that the cationic starchy material it comprises has a content of fixed nitrogen of less than 3.5%, preferentially between 0.3% and 3.5% and very preferentially between 0.7% and 2% by dry weight of nitrogen relative to the total weight of cationic starchy material.

Said cationic starchy material may optionally be modified by means of an operation chosen from hydrolysis, chemical and physical, mechanical, thermomechanical or thermal transformations, as indicated previously.

A final subject of the present invention consists of the use of said emulsion in an operation for sizing a sheet of paper or cardboard.

The examples that follow make it possible to appreciate better the nature of the present invention, without, however, limiting its scope.

EXAMPLES

In all the examples, the granulometry of the emulsions is analyzed using a laser particle size analyzer sold by the company Malvern under the name Mastersizer® 2000, with the following parameters:

- 800 ml of demineralized water
- stirring at 1900 rpm
- background measurement: 10 s
- 3 consecutive measurements per sample (interval between the measurements: 0 s)
- duration of each measurement: 10 s
- laser obscuration: between 8% and 13%
- refractive index: 1.5
- dispersant (water) refractive index: 1.33
- absorption: 0.01
- particle shape model=spherical

Example 1

The aim of this example is to illustrate the manufacture of an emulsion of ASA in an aqueous solution of cationic starchy material in a device according to the invention not containing a recirculation loop in the emulsification unit, and with a device according to the prior art. It also has the object of illustrating the influence of the solids content of the initial aqueous solution of cationic starchy material on the granulometry of the emulsion prepared.

An aqueous solution of cationic starchy material sold by the company Roquette under the name Vector® SCA 2015 is used. The ASA which is the product Chemsize® A180 sold by the company Chemec is also used. This product contains 0.5% by weight of sodium dioctyl sulfosuccinate as surfactant (also known as DOSS).

Feeding with water is performed using an existing distribution network. The transfers and metering of the ASA and of the aqueous solution of cationic starchy material to this emulsification platform are performed from their respective mobile container or storage tank, by means of pipes and volumetric pumps, the rotation speeds of which are regulated at the desired nominal flow rates and at the target cationic starchy material (dry)/ASA ratio.

The aqueous solution of cationic starchy material is diluted online. The flow rate of dilution water is regulated by the flow rate of the commercial aqueous solution of cationic starchy material, as a function of the desired solids content. A static mixer homogenizes this dilute aqueous solution. The ASA is then introduced online, into the homogeneous dilute aqueous solution of cationic starchy material.

This "aqueous solution of cationic starchy material/ASA" mixture is then conveyed via a pipe to the emulsification unit. This continuous single-pass emulsification system has a series of 3 consecutive rotors/stators, each rotor and each stator of which is composed of 3 rows of concentric toothed crowns. This process operates at variable speed; the rotation speed depends on the passing hydraulic flow rate, on the nature of the constituents and the proportions thereof, on the pressure in the emulsification chamber, and also on the desired fineness of the emulsion. The emulsification unit outlet is equipped with a temperature sensor, a pressure sensor, a valve for maintaining pressure of 3 bar in the process, and a flowmeter.

In this example, the dry content of the aqueous solution of cationic starchy material was varied from 3% to 20%, the cationic starchy material/ASA dry ratio from 0.3 to 0.5, the flow rate at the emulsification unit outlet from 80 to 140 kg/h, the peripheral speed of the emulsification unit rotor being set at 40 m/s.

In all the tests, the temperature T° C. of the emulsion leaving the emulsification unit is determined, and a granulometric analysis is performed according to the protocol already presented, so as to determine the mean diameter and the parameter %<2 μm. In all the tests, except test 6, the emulsion at the emulsification unit outlet is recovered, whereas in test 6, the emulsion is recirculated at least once more in said unit.

The results are collated in Table 1, with the following abbreviations:

Flow rate (kg/h): flow rate at the emulsification unit outlet

SM/ASA: cationic Starchy Material/ASA dry weight ratio

SC SM (%): solids content of cationic starchy material in the initial solution

T° (° C.): temperature of the final emulsion leaving the emulsification unit

%<2 μm: volume percentages of particles less than 2 μm in diameter d mean (μm): mean particle diameter

TABLE 1

| Tests | Flow rate (kg/h) | SM/ASA | SC SM (%) | T° (° C.) | % < 2 μm | d mean (μm) |
|---|---|---|---|---|---|---|
| 1 | 125 | 0.5 | 5 | 40 | 64.9 | 2.03 |
| 2 | 80 | 0.3 | 5 | 44 | 77.0 | 1.80 |
| 3 | 125 | 0.3 | 3 | 39 | 39.1 | 2.58 |
| 4 | 110 | 0.3 | 3 | 38 | 34.7 | 2.80 |
| 5 | 125 | 0.3 | 8 | 46 | 80.2 | 1.43 |
| 6* | 125 | 0.3 | 8 | 63 | 75.4 | 1.55 |
| 7 | 100 | 0.3 | 20 | 83 | 47.0 | 2.36 |
| 8 | 140 | 0.3 | 13 | 56 | 58.2 | 2.04 |
| 9 | 125 | 0.3 | 7 | 43 | 82.5 | 1.46 |
| 10 | 125 | 0.5 | 7 | 42 | 84.9 | 1.48 |
| 11 | 125 | 0.5 | 6 | 41 | 81.7 | 1.49 |
| 11** | 125 | 0.5 | 6 | 41 | 82.0 | 1.50 |

*2 circulations in the emulsification unit, by ordered and consecutive passings

**granulometric analysis performed after 90 minutes of storage at room temperature Tests 1 to 4 demonstrate that, at two given SM/ASA ratios and for an excessively low solids content of cationic starchy material (3% and 5%), an excessively high mean diameter is obtained (notably very much higher than 2 μm for tests 3 and 4) and/or an excessively low value of %<2 μm is obtained. This therefore does not give an optimal amount of particles whose diameter is between 1 μm and 1.5 μm, which means that particles of larger size are generated, which may give rise to fouling problems.

Similarly, tests 7 and 8 performed with a large solids content of starchy material do not give the desired granulometry. In addition, they lead to high emulsion temperatures which run the risk of facilitating detrimental hydrolysis of the ASA.

As regards test 6*, it demonstrates that the 2 ordered and consecutive passings of the emulsion through the emulsification unit cause a very large increase in temperature.

In summary, only tests 5, 9, 10 and 11 lead to a final product characterized by a mean particle diameter of between 1 μm and 1.5 μm, with a %<2 μm index of greater than 80%, and with a low increase in temperature. This thus gives an emulsion that is potentially very efficient as a sizing agent by virtue of its granulometry, and which is advantageously free of any detrimental hydrolysis phenomenon. Test 11** demonstrates that, over a long storage period, the manufactured emulsion conserves its granulometric characteristics.

Example 2

The aim of this example is to illustrate the manufacture of an emulsion from ASA and from an aqueous solution of cationic starchy material in a device according to the invention without a recirculation loop. It notably illustrates the influence of the solids content of the initial aqueous solution of cationic starchy material on the granulometry of the emulsion prepared, and on the hydrophobic nature of a paper manufactured with this emulsion.

This example is performed under the same conditions as the preceding example, the only difference being that the continuous single-pass emulsification system has only one rotor/stator, each of the two parts of which is composed of 3 rows of concentric toothed crowns.

Tests 12 to 16 use, in a device according to the invention, an aqueous solution of cationic starchy material sold by the company Roquette under the name Vector® SCA 2015 and of ASA which is the product Chemsize® A180 sold by the company Chemec. The cationic starchy material (SM)/ASA dry weight ratio here is equal to 0.3. The peripheral speed is set at 40 m/s and the flow rate at the emulsification unit outlet is equal to 140 kg/h. Tests 12, 13, 14, 15 and 16 use, respectively, a solids content of 2%, 7%, 9%, 12% and 16% cationic starchy material in the initial aqueous solution.

In all the tests, the temperature T° C. of the emulsion at the emulsification unit outlet is determined, and a granulometric analysis is performed according to the protocol already presented, so as to determine the mean diameter d and also the parameter %<2 μm. All the results are given in Table 2, the abbreviations remaining unchanged.

TABLE 2

| Tests | SC SM (%) | T° (° C.) | % < 2 μm | d mean (μm) |
|---|---|---|---|---|
| 12 | 2 | 34 | 39.1 | 2.70 |
| 13 | 7 | 41 | 81.3 | 1.48 |
| 14 | 9 | 43 | 80.8 | 1.42 |
| 15 | 12 | 47 | 69.6 | 1.79 |
| 16 | 16 | 70 | 52.5 | 2.61 |

It is clearly seen that the product obtained according to test 16 underwent a very large increase in its temperature: it is thus subject to ASA hydrolysis that is prohibitive to its use as a sizing agent, as will be demonstrated later.

For these emulsions, laboratory sheets of paper known as handsheets are prepared using a FRET machine (handsheet retention tester) sold by the company Techpap. These handsheets have characteristics close to that of client industrial paper, notably as regards flocculation and retentions.

The process for manufacturing the handsheet uses a paper pulp which is a pulp of virgin fibers (50% coniferous, 50% broad-leaved) with a refining level of 35° Schopper (SR). 35% (by dry weight relative to the total weight of the pulp) of natural calcium carbonate sold by the company Omya under the name Omyalite® 50 is added. The charged fibrous suspension has a concentration of 2.5 g/l. 0.3% (dry equivalent/paper) of a size Hicat® 5163AM (Roquette) is then added. Finally, 0.35% (relative to the paper) of the ASA emulsion is added. A handsheet with a basis weight of 70 g/m$^2$ is thus prepared.

After manufacture of the handsheet, it is placed between two sheets of blotting paper and the assembly is passed twice through a Techpap brand roll press. The handsheet is then separated from the blotting papers and is placed in a Techpap brand dryer for 5 minutes at 100° C. Maturation of the handsheets is then performed, by placing them for 30 minutes in an oven at 110° C., to allow the sizing agent to give the paper its hydrophobic nature. The handsheets are then placed for a minimum of 24 hours in an air-conditioned room at 23° C. (±1° C.) and 50% relative humidity (±2%) (standards ISO 187: 1990 and Tappi T402 sp-08).

A Cobb 60 measurement (standards ISO 535: 1991 and Tappi T441 om-04) is then performed, which relates to the hydrophobicity of the paper: the smaller the amount of water absorbed, the more hydrophobic the paper (Table 3). For the handsheets made from the emulsions according to tests 12 to 16, a mean Cobb value equal to 47, 28, 25, 45 and 51 g/m$^2$ is found, respectively. It is thus demonstrated that it is indeed the handsheets made according to the invention (tests 13 and 14) which have the highest hydrophobicity.

Example 3

The aim of this example is to illustrate the manufacture of an emulsion from ASA and from an aqueous solution of cationic starchy material in a device according to the invention not containing a recirculation loop. It notably demonstrates that the granulometric characteristics of the manufactured emulsions are constant over time.

The tests use the aqueous solution of cationic starchy material Vector® SCA 2015 and the product Chemsize® A180. They are performed using a device identical to that described in the preceding example.

This example is performed under the same conditions as those of Example 2. Here, the solids content was set at 8%, the cationic starchy material/ASA dry ratio at 0.32 and the flow rate at the emulsification unit outlet at 220 L/h and the peripheral speed at 40 m/s.

3 granulometric analyses are formed here on 3 samples collected at 45 minutes, 3 hours and 5 hours. Besides the mean diameter d and the parameter %<2 μm, the volume percentage of particles whose diameter is within a certain range was also determined: the corresponding results are given in Tables 3, 3a and 3b.

TABLE 3

(after 45 minutes of running)

| % (volume) | between (μm) | |
|---|---|---|
| 100.00 | 0.48 | 3.80 |
| 99.73 | 0.55 | 3.31 |
| 82.15 | 0.83 | 2.19 |
| 75.32 | 0.83 | 1.90 |
| 48.50 | 1.10 | 1.66 |
| 25.37 | 1.26 | 1.44 |
| 81.5 | % < 2 μm | |
| Mean diameter | | 1.43 |

TABLE 3a (after 3 hours of running)

| % (volume) | between μm) | |
|---|---|---|
| 100.00 | 0.48 | 3.80 |
| 99.86 | 0.55 | 3.31 |
| 97.89 | 0.63 | 2.88 |
| 92.18 | 0.72 | 2.51 |
| 75.72 | 0.83 | 1.90 |
| 48.62 | 1.10 | 1.66 |
| 25.43 | 1.26 | 1.44 |
| 12.82 | 1.30 | 1.41 |
| 87.8 | % < 2 μm | |
| Mean diameter | | 1.41 |

TABLE 3b (after 5 hours of running)

| % (volume) | between (μm) | |
|---|---|---|
| 100.00 | 0.55 | 3.31 |
| 98.77 | 0.63 | 2.88 |
| 93.39 | 0.72 | 2.51 |
| 76.74 | 0.83 | 1.90 |
| 49.46 | 1.10 | 1.66 |
| 25.89 | 1.26 | 1.44 |
| 88.3 | % < 2 μm | |
| Mean diameter | | 1.42 |

Not only is the consistency of the manufactured emulsions in terms of granulometric characteristics demonstrated, but also it is clearly demonstrated afterward that the particle size distributions are monodisperse.

The invention claimed is:

1. A process for manufacturing an emulsion of alkenyl-succinic anhydride (ASA) in an aqueous solution of cationic starchy material, comprising the steps of:

a) preparing an aqueous solution of cationic starchy material, b) mixing the ASA and the aqueous solution of cationic starchy material obtained from step a), so as to obtain a cationic starchy material/ASA dry weight ratio of less than 1, c) preparing in a single pass in an emulsification unit an emulsion from the mixture obtained from step b), wherein:

the process does not involve recirculation of the emulsion obtained from step c) in the emulsification unit, the aqueous solution of cationic starchy material obtained from step a) has a solids content between 5.5% and 11.5% of its total weight, and the aqueous solution of cationic starchy material has a content of fixed nitrogen of less than 3.5% by dry weight of nitrogen relative to the total dry weight of cationic starch material;

wherein said process is performed in a device consisting of:

a unit (a') for storing the aqueous solution of cationic starchy material to perform step a), a unit (b') for mixing ASA and the aqueous solution of cationic starchy material, connected to the unit (a') to perform step b), a emulsification unit (c') comprising mechanical means of shearing or milling for emulsifying the mixture of ASA and of the aqueous solution of cationic starchy material, the emulsification unit (c) being connected to the unit (b'), to perform step c), said device not containing a recirculation loop in the emulsification unit (c').

2. The process as claimed in claim 1, wherein the ASA is a product of synthetic origin, which is a modified oil that results from C16-C18 fractions.

3. The process as claimed in claim 1, wherein the cationic starchy material is modified by one of a hydrolysis, chemical and physical, mechanical, thermomechanical or thermal transformation operation.

4. The process as claimed in claim 2, wherein the cationic starchy material is modified by one of a hydrolysis, chemical and physical, mechanical, thermomechanical or thermal transformation operations.

* * * * *